United States Patent [19]
Victor

[11] 3,893,687
[45] July 8, 1975

[54] HAND TRUCK WITH SAFETY STAND

[76] Inventor: Leslie E. Victor, 120 Linden Dr., Ventura, Calif. 93003

[22] Filed: May 30, 1974

[21] Appl. No.: 474,357

[52] U.S. Cl............................ 280/47.27; 280/47.33
[51] Int. Cl.² ........................................... B62B 1/10
[58] Field of Search............ 280/47.33, 47.12, 47.2, 280/47.27, 47.29

[56] References Cited
UNITED STATES PATENTS

| | | | |
|---|---|---|---|
| 868,099 | 10/1907 | Koen | 280/47.33 |
| 2,602,676 | 7/1952 | Fieldhouse | 280/47.12 |
| 2,710,759 | 6/1955 | Bayer et al | 280/47.33 |
| 3,064,990 | 11/1962 | Salvucci | 280/47.2 |
| 3,578,353 | 5/1971 | Lockhart | 280/47.2 |

FOREIGN PATENTS OR APPLICATIONS

| | | | |
|---|---|---|---|
| 1,487,320 | 5/1967 | France | 280/47.12 |

*Primary Examiner*—David Schonberg
*Assistant Examiner*—John A. Pekar
*Attorney, Agent, or Firm*—John E. Kelly

[57] ABSTRACT

A hand truck is equipped with a releasable safety stand that has a retractable and free swinging support leg unit. The support leg unit is pivoted in a manner to be responsive to gravity so that when a workman tilts the hand truck rearwardly, the support leg unit moves from a collapsed or retracted position to an extended position. A hand operable release mechanism holds the support leg unit in the desired extended position until tripped by the workman. The swing angle and length of the support leg unit are both adjustable to accommodate various loads and hand truck models.

9 Claims, 3 Drawing Figures

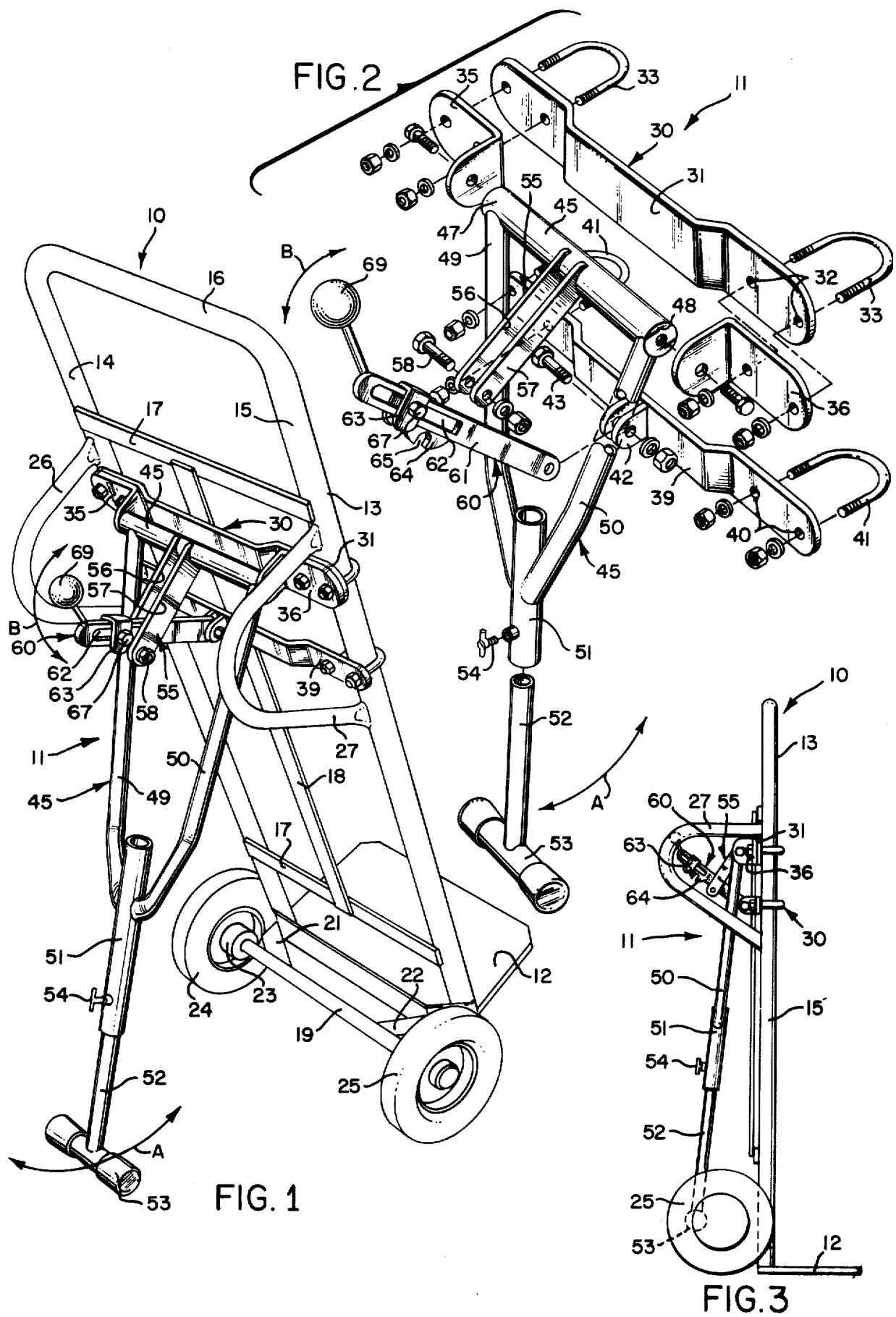

HAND TRUCK WITH SAFETY STAND

BACKGROUND OF THE INVENTION

This invention generally relates to hand trucks and more specifically to a safety attachment for alleviating fatigue and hard work associated with maneuvering hand trucks.

Hand trucks, sometimes called hand carts or warehouse trucks, are used to transfer heavy or cumbersome loads from place to place. They are frequently used, for example by delivery servicemen, by clerks in grocery and department stores and by workmen in industrial plants.

Conventional hand trucks have a generally long upstanding back support mounted on a pair of wheels and a base support that may be wedged under a given load. A workman must tilt or rock the back support rearwardly with the wheels serving as a pivot in order to thereby shift the load back into position. He may then roll the hand truck to a different location for unloading, usually by pushing a pair of handles attached to the back support.

When the workman is required to make many stops, for loading or unloading or any other reason, he expends considerable energy. To temporarily park or immobilize the hand truck, he must rock or tilt the back support forwardly until the base support rests on the ground.

In order to resume motion of the hand truck, he must again jerk or pull the back support across dead center until the weight of the load is balanced or shifted enough for safe travel.

Such necessary and repititious back-and-forth manipulations by the workman are fatiguing and back-straining and may eventually be hazardous to his personal safety and health.

Some hand trucks have been equipped or modified to serve various functions. U.S. Pat. No. 2,980,200 to Kibby discloses a hand truck that is convertible for use as a ladder. The hand truck is modified with a pair of hollow rigid posts that serve as the longitudinal side members of a ladder.

U.S. Pat. No. 2,938,734 to Guimond discloses a hand truck convertible for use as a cart or table in order to minimize spillage in transporting beverages.

U.S. Pat. No. 2,710,759 to Bayer et al. discloses a hand truck equipped with an hydraulic hoist so that the hand truck can also be used as a load lifting mechanism.

SUMMARY OF THE INVENTION

Briefly stated, this invention primarily concerns a safety stand attachment for hand trucks and may be used to substantially unburden a workman required to transport heavy loads.

In its broader aspects, this invention relates to a safety stand for use with an ordinary hand truck of the type including a relatively upstanding back support and a base platform. in response Bracket means is removably mounted to an upper portion of the hand truck back support. A support leg unit is pivotally coupled to a relatively upper part of the bracket means and is arranged for free swinging movement inresponse to gravity force towards and away from the hand truck back support as the hand truck is tilted forwardly and rearwardly respectively. Locking means is connected to the support leg unit. A hand operable release mechanism is coupled to a relatively lower part of the bracket means and is arranged to releasably engage the locking means.

Preferably the support leg unit includes a length adjustment means for selectively varying and fixing the end-to-end length of the support leg.

The support leg unit includes a cross bar pivotally coupled by its opposing ends to the bracket means. A pair of side members depend from adjacent the opposing sides of the cross bar. A joint interconnects the side members and a depending strut is coupled to the joint. The joint is preferably a sleeve and the strut is slidably and telescopically coupled within the sleeve.

The release mechanism has an adjustable catch for selectively varying and fixing the swing angle of the support leg unit. A slide member of the release mechanism defines the adjustable catch. The release mechanism has a swing bar formed with an elongated laterally extending slot that slidably mounts the slide member.

A locking means includes a rigid link fixed to and extending generally downwardly and rearwardly from the cross bar. A pin is connected to and extends transversely of the rigid link and into selective engagement with the adjustable catch. The rigid link includes a pair of laterally spaced link members straddling the swing bar with the pin arranged to extend between outermost ends of the link members.

The bracket means includes an upper bracket demountably secured to a relatively upper part of the hand truck back support. The support leg unit is coupled to the upper bracket.

The bracket means also embodies a relatively lower bracket that is demountably secured to a relatively lower part of the hand truck back support. The lower bracket mounts the release mechanism.

BRIEF DESCRIPTION OF THE DRAWINGS

The numerous benefits and unique aspects of the present invention will be fully understood when the following detailed description is studied in conjunction with the drawings in which:

FIG. 1 is a perspective view showing a safety stand constructed in accordance with this invention secured for operation to a conventional hand truck;

FIG. 2 is a perspective, exploded and detailed view of all components embodied by the safety stand; and, FIG. 3 is a side elevational view of the hand truck - safety stand unit showing the support leg unit relatively collapsed or retracted.

DETAILED DESCRIPTION OF THE PREFERRED EMBODIMENT

Referring now to the drawings and primarily FIG. 1 a conventional hand truck 10 is shown equipped with a demountable safety stand 11.

The hand truck 10 has a base platform 12 sometimes called a toe plate and a generally upstanding back support 13 that is a U-shaped framework. Back support 13 includes a pair of integrally formed and longitudinally extending side arms 14 and 15 linked together by a top cross arm 16. Horizontal and vertical bracing strips 17 and 18 aid in rigidifying the framework of back support 13.

An axle housing 19, in back of base platform 12, is fixed to the back support 13 by way of diagonal bracing strips 21 and 22. The axle housing 19 terminates in axle bearing boxes 23 associated with a pair of wheels 24 and 25. The wheels 24 and 25 are set apart by a sufficient distance to be laterally offset from the side edges of base platform 12 and the side arms 14 and 15.

The axle within axle housing 19 and wheels 24 and 25 serve as a pivot point or fulcrum when a workman grasps the rearwardly extending handles 26 and 27 to tilt hand truck 10 rearwardly or forwardly.

FIG. 2 shows all of the important components associated with safety stand 11 disassembled and exploded away from one another while FIG. 1 shows the same components fully assembled for operation in connection with the hand truck 10.

The safety stand 11 is demountably or removably secured to hand truck back support 13 by way of a bracket means 30. An upper bracket 31 spans across and is coupled to back support side arms 14 and 15 with the aid of connector holes 32, U-bolts 33, and associated nuts. A pair of right angle or L-shaped bearing plates 35 and 36 are associated with opposing ends of upper bracket 31.

A lower bracket 39 also spans across and may be coupled to back support side arms 14 and 15. Securement holes 40, a pair of U-bolts 41 and associated nuts may be used to secure the lower bracket 39 to a relatively lower point of back support 13. Extending rearwardly from the center of lower bracket 39 is a lug 42 which serves as a pivot point and accommodates a pivot pin 43.

Pivotally secured to the bracket means 30 is a support leg unit 45 which includes a cross bar 46. The opposing ends 47 and 48 of cross bar 46 are journalled or rotatably coupled to the bearing plates 35 and 36 respectively so that the entire support leg unit 45 may experience free swinging movement, responsive to gravitational force. When a workman tilts or rocks back support 13 rearwardly beyond a vertical plane, the support leg unit 45 is free to swing away from hand truck 10.

The support leg unit 45 includes a pair of side members 49 and 50 which depend from opposing ends of cross bar 46 and converge to form a joint that defines a sleeve 51.

Sleeve 51 slidably and telescopically retains an elongated strut 52 whose base is formed with a stabilizing foot 53. A length adjustment means is provided for selectively varying and fixing the end-to-end length of the support leg unit 45. This is accomplished by sliding strut 52 to a predetermined or desired position relative to sleeve 51 and then torquing a tightening element 54 which may be a conventional set screw or wing nut.

A locking means 55 is rigidly connected to a central part of the support leg unit 45. It includes a pair of parallel and laterally spaced link members 56 and 57 that extend generally downwardly and rearwardly from the center of cross bar 46. A locking pin 58 extends between and is secured to the distal or outer ends of link members 56 and 57.

A hand operable release mechanism 60 is pivotally coupled to lower bracket 39 by way of central lug 42 and pivot pin 43. The release mechanism 60 has a generally elongated swing bar 61 formed with an elongated and laterally extending slot 62.

Mounted for travel along and within slot 62 is a slide member 63 which carries a catch 64 disposed beneath slot 62. Catch 64 defines a locking notch 65 for accommodating the pin 58 associated with locking means 55.

The catch 64 is adjustable in order to selectively vary and fix the swing angle of the support leg unit, i.e., the angle between the general plane of support leg unit 45 and general plane of the hand truck back support 13.

When the desired or optimum swing angle is determined then an adjustment nut 67 may be tightened by the workman in order to fix the relative positions of the locking means 55 and release mechanism 60. A knob 69 may be grasped and manipulated to trip and otherwise operate the release mechanism 60. When release mechanism 60 is tripped and swung inwardly as indicated by directional arrow B then the support leg unit 45 is free to swing towards hand truck 10 as indicated by directional arrow A.

OPERATION

Keeping the above construction in mind, it can be understood how many of the previously described disadvantages of conventional hand trucks are overcome or substantially eliminated by this invention.

The safety stand 11 may be included as original equipment or subsequently installed by merely clamping the upper and lower brackets 31 and 39 to the hand truck back support 13 with the aid of U-bolts 33 and 41 and other connectors.

The end-to-end length of support leg unit 45 and the position of slide member 63 on the release mechanism 60 will vary depending on factors such as the load size, the center of gravity of the load and hand truck, the particular hand truck model and the personal preference of the workman. Requirements can be accommodated by simple adjustments, quickly performed by a single workman.

In the case of using ordinary hand trucks, the standard and unavoidable practice requires the workman to break the load over center until a comfortable point of balance is reached. At this time he may commence rolling or wheeling the hand truck along its journey. Interruptions frequently occur when a door must be opened, an obstruction negotiated, or the workman must attend to other matters. In order to stop the hand truck, for these or any other reasons, the workman must tilt the hand truck forwardly and break the load over center again but in the opposite direction. Then to resume rolling the hand truck forwardly, he must again break the load over center, etc. This activity is aggravating and tedious during the working day and can cause back strain, pulled muscles and general fatigue.

This normal routine is largely eliminated with the assistance of this invention, since, after breaking the load over center originally, the workman may leave or park the hand truck 10 near the load balance position and attend to other matters. Under these circumstances, only a slight amount of manual energy will be required to tilt the hand truck and shift the load forwardly to the optimum balance position - in order to resume pushing the hand truck 10.

After a particular heavy load of cargo is placed on base platform 12 the workman rocks or pivots the back support 13 rearwardly. As the back support 13 passes through a vertical plane, the support leg unit 45 becomes free, under gravitational force, to swing away from its retracted or collapsed position near back support 13 to an operational or extended position. The exact angular displacement will depend on the various factors previously mentioned. When the workman achieves a general balance and the load seems comfortable, then the two necessary adjustments may be undertaken.

Strut 52 is permitted to slide through sleeve 51 until it contacts the ground or floor at which time the length adjustment means 54 may be manipulated to set its position. Similarly the release mechanism 60 is arranged so that slide member 63 will be properly oriented with respect to the locking means 55. Then, adjustment nut 67 is tightened to fix the inter-relationship between catch 64 and locking pin 58. Both adjustments are made so that if the workman must or wishes to leave the hand truck 10 unattended for awhile, the amount of energy or effort that will be necessary to restore the load to the prior travelling position will be nominal or negligible, i.e., in the order of 5 to 10 pounds.

Again, as the load is changed, so may the adjustments be changed.

From the foregoing, it will be evident that the present invention has provided a hand truck with safety stand in which all of the various advantages are fully realized.

What is claimed is:

1. A safety stand for use with a hand truck of the type having a back support and base platform, the safety stand comprising:
   a. bracket means capable of being removably mounted to a relatively upper portion of the hand truck back support;
   b. a support leg unit pivotally coupled to a relatively upper part of the bracket means and arranged for free swinging movement in response to gravity force towards and away from the hand truck back support as the hand truck is tilted forwardly and rearwardly respectively the support leg including,
      b.1 a cross bar pivotally coupled by its opposing ends to the bracket means,
      b.2 a pair of side members depending from adjacent the opposing ends of the cross bar,
      b.3 a joint interconnecting the side members, and,
      b.4 a depending strut coupled to the joint; and,
   c. locking means connected to the support leg unit including a hand operable release mechanism coupled to a relatively lower part of the bracket means and releasably engaging the locking means, the release mechanism having an adjustable catch for selectively varying and fixing the swing angle of a support leg unit.

2. The structure according to claim 1, wherein the support leg unit includes:
   length adjustment means for selectively varying and fixing the end-to-end length of the support leg unit.

3. The structure according to claim 1, wherein:
   a. the joint is a sleeve;
   b. the strut is slidably and telescopically coupled within the sleeve; and,
   c. length adjustment means interconnects the sleeve and strut and is arranged for selectively varying and fixing the end-to-end length of the support leg unit.

4. The structure according to claim 1, wherein the release mechanism includes:
   a. a slide member that defines the adjustable catch; and,
   b. a swing bar formed with an elongated laterally extending slot that slidably mounts the slide member.

5. The structure according to claim 1 wherein the locking means includes:
   a. a rigid link fixed to and extending generally downwardly and rearwardly from the cross bar; and,
   b. a pin connected to and extending transversely of the rigid link and into selective engagement with the adjustable catch.

6. The structure according to claim 5, wherein:
   the rigid link includes a pair of laterally spaced link members straddling the swing bar with the pin extending between and coupled to the outermost ends of the link members.

7. The structure according to claim 1, including:
   a. an upper bracket of the bracket means which mounts the support leg unit; and,
   b. a lower bracket of the bracket means which mounts the release mechanism.

8. The structure according to claim 1, wherein:
   the support leg includes length adjustment means for selectively varying and fixing the end-to-end length of the support leg unit; and
   the release mechanism includes a slide member that defines the adjustable catch, and, a swing bar formed with an elongated laterally extending slot that slidably mounts the slide member.

9. A hand truck combined with a removable safety stand, comprising:
   a. a hand truck having a generally upstanding back support and a base platform;
   b. an upper bracket demountably secured to a relatively upper part of the hand truck back support;
   c. a lower bracket demountably secured to a relatively lower part of the hand truck back support;
   d. a pair of bearing plates coupled to opposing ends of the upper bracket;
   e. a support leg unit having a cross bar rotatably coupled by its opposing ends in corresponding bearing plates to allow free swinging movement by the support leg unit in response to gravity force towards and away from the hand truck when the hand truck is tilted forwardly and rearwardly respectively, the support leg including:
      e.1 a sleeve,
      e.2 a strut slidably and telescopically coupled within the sleeve and
      e.3 length adjustment means interconnecting the sleeve and strut and arranged for selectively varying and fixing the end-to-end length of the support leg;
   f. an adjustable catch for selectively varying and fixing the swing angle between the support leg unit and the hand truck back support; and
   g. locking means including;
      g.1 a hand operable release mechanism coupled to the lower bracket and releasably engaging the locking means, the release mechanism including a slide member defining the adjustable catch and a swing bar formed with an elongated laterally extending slot that slidably mounts the slide member,
      g.2 a rigid link fixed to and extending generally downwardly and rearwardly from the cross bar, the rigid link including a pair of laterally spaced link members straddling the swing bar,
      g.3 a pin connected to and extending transversely of the rigid link, the pin extending between and being coupled to the outer ends of the link members.

* * * * *